United States Patent [19]

Pike

[11] Patent Number: 4,722,745
[45] Date of Patent: Feb. 2, 1988

[54] GAS CLEANING SYSTEM FOR HIGH TOP PRESSURE BLAST FURNACES

[75] Inventor: Daniel E. Pike, Harrington Park, N.J.

[73] Assignee: AirPol, Inc., Teterboro, N.J.

[21] Appl. No.: 40,041

[22] Filed: Apr. 13, 1987

[51] Int. Cl.⁴ .............................................. B01D 47/00
[52] U.S. Cl. ...................................... 55/226; 55/223; 55/227; 55/233; 55/257 R; 55/255; 261/124; 261/97
[58] Field of Search .................. 55/223, 233, 255, 256, 55/259, 226, 227, 257 R; 261/122, 124, 97, 96

[56] References Cited

U.S. PATENT DOCUMENTS

| 380,040 | 3/1888 | Klonne | 261/124 |
| 3,334,470 | 8/1967 | Huppe | 55/233 |

FOREIGN PATENT DOCUMENTS

| 2757317 | 7/1978 | Fed. Rep. of Germany | 55/223 |
| 1077665 | 5/1954 | France | 55/223 |

Primary Examiner—Bernard Nozick
Attorney, Agent, or Firm—Samuelson & Jacob

[57] ABSTRACT

A gas cleaning system of the type having a gas cooling tower includes a septum arrangement within the cooling tower which divides the cooling tower into upper and lower chambers and effects a pressure drop between the chambers by directing streams of higher pressure gases through a pool of cooling water maintained in a trough in the septum arrangement to reduce the pressure while simultaneously scrubbing the gases, all within the cooling tower.

14 Claims, 4 Drawing Figures

GAS CLEANING SYSTEM FOR HIGH TOP PRESSURE BLAST FURNACES

The present invention relates generally to the treatment and handling of gases discharged in various industrial processes and pertains, more specifically, to the cleaning and reduction of pressure in gases such as those discharged from high top pressure blast furnaces.

Industrial processes which discharge high-pressure, contaminated gases require systems for treating and handling these discharged gases to render the gases usable within the heat recovery equipment employed in these processes. In particular, high top pressure blast furnaces have found increased acceptance in the steel industry in that advantages in iron production are attained by the use of high pressure in the process which occurs within the blast furnace itself; however, the contaminated, high pressure gases which are discharged from such blast furnaces must be cleaned and pressure must be reduced before the gases can be used further. Current gas cleaning systems utilize septum valves placed in the system for reducing pressure in the gases to acceptable levels subsequent to scrubbing the contaminated, high pressure gases. Septum valves are effective, but are subject to vibration, high noise levels and rapid wear. It would be advantageous to have available a reliable gas cleaning system capable of effective cleaning and the reduction of pressure in discharged high pressure gases found in industrial processes such as those encountered in the operation of high top pressure blast furnaces.

Accordingly, the present invention provides an improvement in a gas cleaning system for cleaning and reducing pressure in discharged high pressure gases found in industrial processes such as those encountered in high top pressure blast furnaces, among the objects and advantages of which improvement are: Simplicity in design and construction for ease of manufacture and reliable operation; minimal deviation in overall system design from existing systems for widespread application and acceptance; ease of use within a range of conditions for increased flexibility in system operations; economical construction for relatively low cost installation; enhanced capabilities, both in cleaning and pressure reduction, with economy and long-term reliability; and effective noise reduction without a concomitant increase in complexity or expense.

The above objects and advantages, as well as further objects and advantages, are attained by the present invention which may be described briefly as an improvement in a gas cleaning system of the type having a gas cooling tower through which gases under pressure, such as gases discharged from a high top pressure blast furnace, are passed in connection with the cleaning and reduction of pressure of the gases, the cooling tower having an interior through which the gases flow axially upwardly, while cooling water is passed axially downwardly counter to the upward flow of the gases, for subsequent discharge, the improvement including a pressure-reducing septum arrangement in the gas cooling tower, the septum arrangement comprising: a septum placed within the interior of the gas cooling tower and dividing the interior into an upper chamber and a lower chamber; a trough associated with the septum, the trough communicating with the upper chamber so as to collect cooling water flowing downwardly in the the gas cooling tower and including a generally open top, a generally closed bottom and radially inner and outer spaced apart walls extending axially between the top and the bottom; and a plurality of orifices extending through at least one of the inner and outer walls and located axially between the top and the bottom; the orifices communicating with the lower chamber such that the gases will pass from the lower chamber through the orifices into the cooling water collected in the trough and will proceed from the trough into the upper chamber for subsequent discharge.

The invention will be understood more fully, while still further objects and advantages will become apparent, in the following detailed description of preferred embodiments of the invention illustrated in the accompanying drawing, in which.

Figure 1:
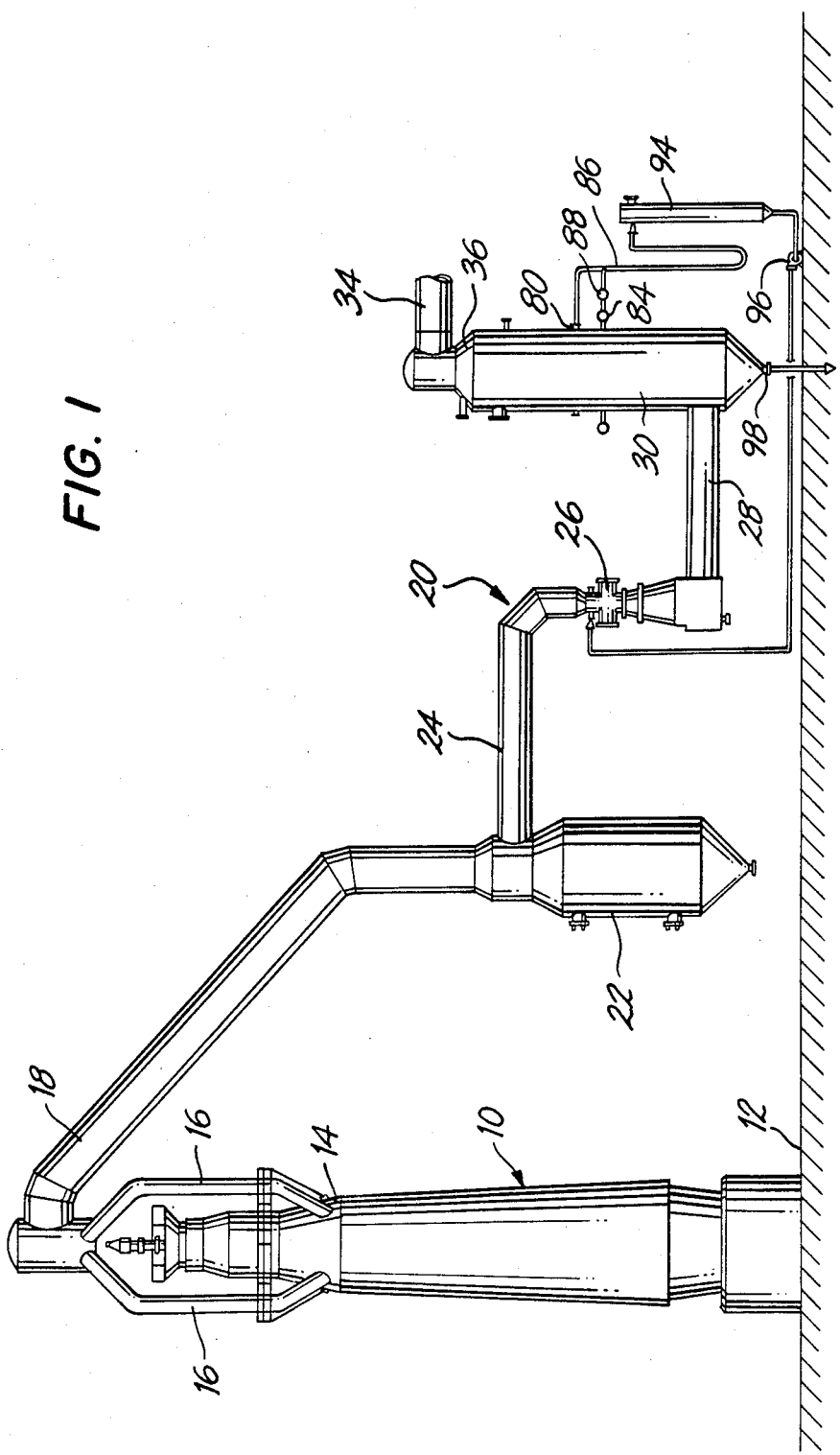
FIG. 1 is an elevational, somewhat diagrammatic view of a gas cleaning system constructed in accordance with the invention.

Referring now to the drawing, and especially to FIG. 1 thereof, a high top pressure blast furnace is represented at 10 and is seen resting on grade level 12 for operation. During operation of the blast furnace 10, high pressure gases, at about twenty-five to fifty psi, are discharged at the top 14 of the blast furnace 10. These gases are contaminated with dust, dirt and other contaminants present in the iron making process and must themselves be processed to clean the gases and reduce the pressure in the gases prior to release of the gases for further use. Thus, the gases are carried by top conduits 16 to a main duct 18 which, in turn, is connected to a gas cleaning system 20 constructed in accordance with the invention.

Gas cleaning system 20 includes a conventional dust catcher 22 which catches a major portion of the particulate contaminants entrained in the gases carried by main duct 18. The partially cleaned gases then are carried by a further duct 24 to a venturi scrubber 26 which scrubs the gases, while reducing the pressure somewhat in the gases, in a now-conventional manner. Upon leaving the venturi scrubber 26, the gases are conducted, through an inlet duct 28, to a gas cooling tower 30. The gases enter the gas cooling tower 30 adjacent the lower end 32 and proceed upwardly, through the gas cooling tower 30, to be processed further, as will be described more fully below, until the gases are delivered to an outlet duct 34, adjacent the upper end 36 of the gas cooling tower 30, and exhausted to a clean gas main (not shown).

Figure 2:
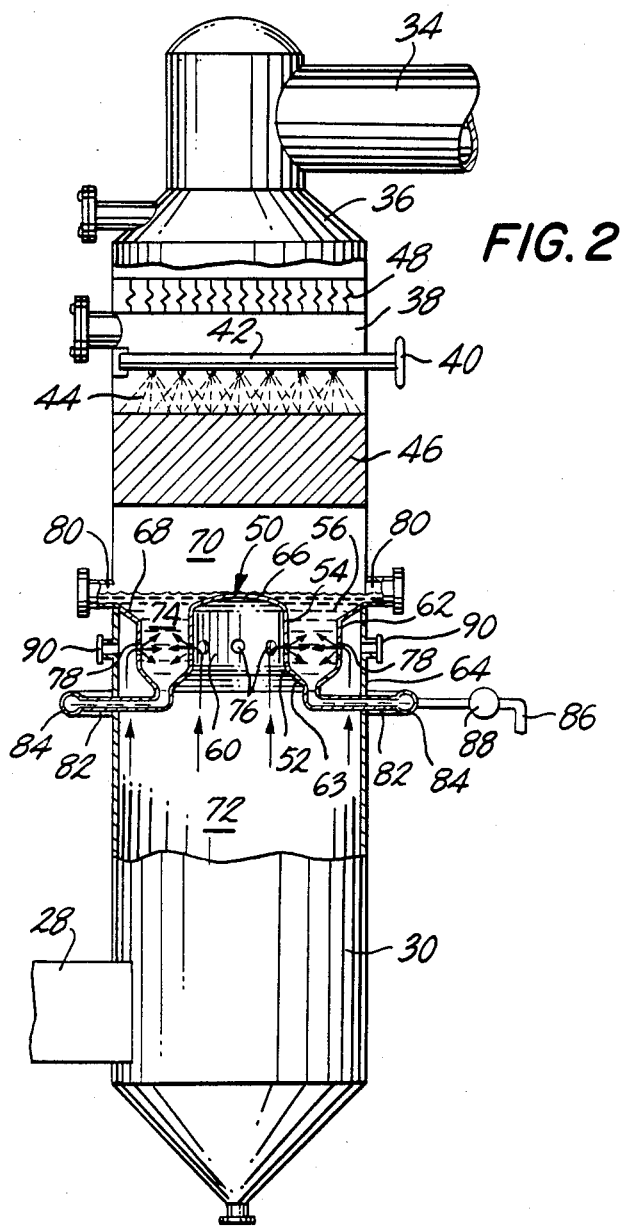
FIG. 2 is an enlarged fragmentary elevational, somewhat diagrammatic view of a component of the system, broken away to show internal details.

Turning now to FIG. 2, cooling tower 30 includes a cooling water inlet 40 which conducts cooling water to a cooling water distributor 42 located within the interior 38 of the cooling tower 30, near the upper end 36 of the cooling tower 30. Cooling water is sprayed downwardly, as at 44, into a gas cooling section 46 in which the cooling water contacts the upwardly flowing gases for cooling, in a conventional manner. A mist eliminator 48 ordinarily is placed above the water distributor 42 for deleting mist from the flow of gases to be exhausted at outlet duct 34.

The improvement of the present invention places a septum arrangement 50 within the interior 38 of cooling tower 30, below the gas cooling section 46. Septum arrangement 50 includes a septum 52 which spans the cross-sectional area of the interior 38 of cooling tower 30 and establishes a trough 54 having a generally annular configuration open at the top 56 thereof toward the upper end 36 of the cooling tower 30. Trough 54 includes an inner wall 60, preferably having a cylindrical configuration extending axially and located centrally of the interior 38, coaxial with the vertical axis of the cooling tower 30, an outer wall 62, also preferably having a cylindrical configuration extending coaxial with inner wall 60, spaced radially outwardly from inner wall 60 to establish annular trough 54, and spaced inwardly from the outer casing 64 of the cooling tower 30, and a bottom wall 63. A domed web 66 spans the inner wall 60 adjacent the top 56 of trough 50, and an annular flange 68 extends radially between the top 56 of trough 50 and the outer casing 64 of cooling tower 30 so that the septum 52 divides the interior 38 of the cooling tower 30 into an upper chamber 70 and a lower chamber 72.

Cooling water from the distributor 42 proceeds downwardly within the upper chamber 70 and collects in trough 54 to form a pool 74 of cooling water placed between the upper and lower chambers 70 and 72. The higher temperature, higher pressure gases entering the lower chamber 72, via inlet duct 28, travel upwardly to septum 52 and pass through a plurality of first orifices 76, placed in inner wall 60, and a plurality of second orifices 78, placed in outer wall 62, into the pool 74 of water in trough 54. The passage of the gases through orifices 76 and 78 and through the pool 74 of water in trough 54 reduces the pressure in the gases so that the pressure in upper chamber 70 is reduced relative to the higher pressure in the lower chamber 72 and the gases can be exhausted at outlet duct 34 at a lower pressure. The pressure reduction is accomplished by the passing of the gases through the orifices 76 and 78 and through the pool 74 of water in trough 54. In addition, the gases are cleaned by passing through the water in trough 54. The septum arrangement 50 attains noise reduction in that the arrangement is housed entirely within the cooling tower 30, as opposed to conventional septum valves which are located beyond the cooling tower of prior systems.

Preferably, each orifice 76 has a counterpart orifice 78 located along the same radius so that corresponding orifices 76 and 78 are located radially opposite one another in trough 54. In this manner, the higher pressure gases entering the orifices 76 and 78 from lower chamber 72 are directed into streams extending radially toward one another so that the streams of gases will impinge upon one another to dissipate gas energy and reduce pressure. Such gas interaction also enhances the scrubbing of the gases within the water in trough 54.

The level of the pool 74 of water in trough 54 ordinarily is determined by the axial location of overflow means shown in the form of overflow ports 80 in the casing 64 of cooling tower 30. Thus, cooling water which accumulates in trough 54 continuously runs off through ports 80 to maintain the level of the pool 74. However, the pressure drop across the septum arrangement 50, between lower and upper chambers 72 and 70, may be regulated by controlling the level of the water in pool 74 within the trough 54. Thus, a plurality of drainage conduits 82 communicate with the trough 54 at the bottom wall 63 and connect with a manifold 84 outside the casing 64 of cooling tower 30. Manifold 84 is connected to a drain line 86 within which drain line 86 is a placed a regulator valve 88. Adjustment of the regulator valve 88 will control the level of the pool 74 in trough 54 to any selected level between the level of the overflow ports 80 and the level of the orifices 76 and 78.

Figure 3:
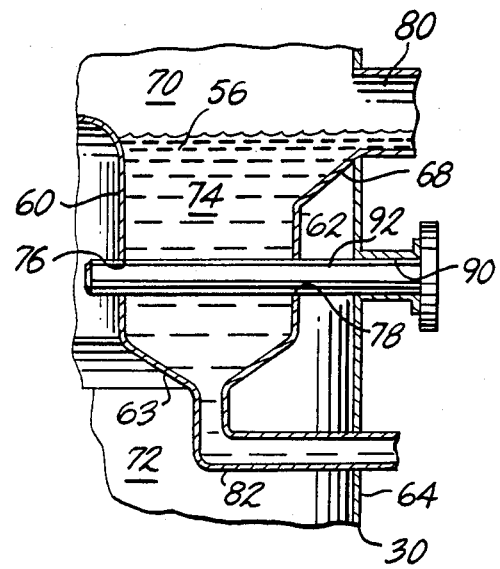
FIG. 3 is an enlarged fragmentary elevational view of a portion of FIG. 2, with an additional operating element.

An additional means for controlling the pressure drop across septum arrangement 50 is provided by valving ports 90 placed in casing 64 of cooling tower 30. As best seen in FIG. 3, each valving port 90 is aligned radially with a pair of opposed orifices 76 and 78 so that a valving rod 92 may be inserted through a valving port 90 and into the corresponding orifices 76 and 78 to close the orifices 76 and 78. By closing off a selected number of the orifices 76 and 78, the pressure drop across the septum arrangement is selectively varied. It is noted that while the orifices 76 and 78 are shown as circular openings, other configurations are feasible; however, the circular configuration enables ease of manufacture, and especially in radial alignment with one another and with valving means such as the illustrated valving means. Moreover, the orifices 76 and 78 each must have a cross-sectional area which enables the passage of gases from the lower chamber 72 into the pool 74 in a radial direction while enabling the cooling water to accumulate to a depth great enough to maintain the orifices 76 and 78 submerged in the pool 74.

Referring back to FIG. 1, excess water diverted from septum arrangement 50, through overflow ports 80 and manifold 84, into drain line 86 is collected in an external holding tank 94 and can be returned by a pump 96 for use in venturi scrubber 26. Any water accomulated at the bottom of the cooling tower 30 is drained off at 98.

Figure 4:
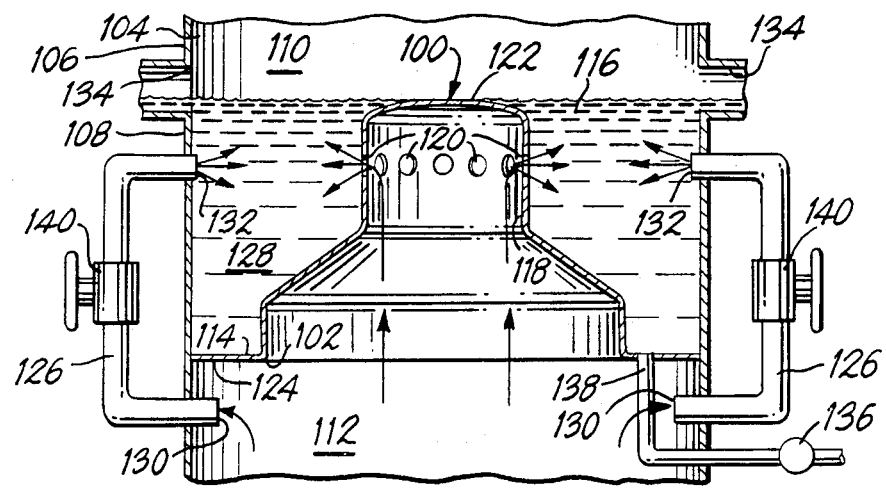
FIG. 4 is an enlarged fragmentary elevational view of a portion of a component similar to that of FIG. 2, but modified to illustrate another embodiment of the invention.

Referring now to FIG. 4, another embodiment of the invention is illustrated in the form of septum arrangement 100 including a septum 102 dividing the interior 104 of a cooling tower 106, having an outer casing 108, into an upper chamber 110 and a lower chamber 112. Septum 102 includes an annular trough 114 having a top 116, open to the upper chamber 110, and an inner wall 118 extending axially upwardly and including radially-directed orifices 120. A web 122 spans the inner wall 118 to close the upper end of the inner wall 118.

However, in septum arrangement 100, the bottom wall 124 of the trough 114 extends radially outwardly to the outer casing 108 of the cooling tower 106 and external by-pass tubes 126 are utilized to conduct gases from the lower chamber 112 to the pool 128 of water in trough 114. The by-pass tubes 126 thus include an inlet 130 located in the lower chamber 112 and have an outlet orifice 132 located in radial alignment with a corresponding orifice 120 in inner wall 118. Thus, counterpart orifices 120 and 132 are opposed radially for directing streams of higher pressure gases toward one another for impingement with one another within the pool 128.

As in the earlier-described embodiment, the level of water in pool 128 is set by the placement of overflow ports 134 in the casing 108, and the level may be varied selectively by a regulator valve 136 placed in a drain line 138. Valving means are provided in the form of individual valves 140 placed in each by-pass tube 126 for selective closing of any number of by-pass tubes 126 to establish a desired pressure drop across the septum arrangement 100 between lower chamber 112 and upper chamber 110.

It will be seen that the septum arrangements described above accomplish the desired pressure reduction in the discharged gases flowing through the cooling tower without the use of an external septum valve. Pressure reduction is attained with a simple construction having component parts arranged for effective operation over a long service life. The pressure drop is controlled and regulated with ease. In addition, the gases are subjected to additional scrubbing prior to being exhausted.

It is to be understood that the above detailed description of embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. In a gas cleaning system of the type having a gas cooling tower through which gases under pressure, such as gases discharged from a high top pressure blast furnace, are passed in connection with the cleaning and reduction of pressure of the gases, the cooling tower having an interior through which the gases flow axially upwardly, while cooling water is passed axially downwardly counter to the upward flow of the gases, for subsequent discharge, the improvement including a pressure-reducing septum arrangement in the gas cooling tower, the septum arrangement comprising:

a septum placed within the interior of the gas cooling tower and dividing the interior into an upper chamber and a lower chamber;

a trough associated with the septum, the trough communicating with the upper chamber so as to collect cooling water flowing downwardly in the gas cooling tower and including a generally open top, a generally closed bottom and radially inner and outer spaced apart walls extending axially between the top and the bottom;

a web connected to the inner walls; and a plurality of orifices extending through at least one of the inner and outer walls and located axially between the top and the bottom;

the orifices communicating with the lower chamber such that the gases will pass from the lower chamber through the orifices into the cooling water collected in the trough and will proceed from the trough into the upper chamber for subsequent discharge.

2. The invention of claim 1 wherein the orifices are oriented so as to direct the gases in generally radial streams into the collected cooling water in the trough.

3. The invention of claim 2 wherein the orifices include a plurality of first orifices in the inner wall and a plurality of second orifices in the outer wall.

4. The invention of claim 3 wherein at least some of the first orifices are located opposite counterpart second orifices in radial alignment therewith such that the radial streams of gases directed from corresponding opposed orifices will impinge upon one another within the collected cooling water in the trough.

5. The invention of claim 4 wherein:
the inner wall is generally tubular;
the outer wall is generally tubular and is spaced radially from the inner wall; and
the trough is generally annular and open toward the upper chamber.

6. The invention of claim 5 wherein the web extends radially across the inner wall adjacent the top of the trough to close the area within the inner wall.

7. The invention of claim 6 wherein the inner wall is located so as to be generally centered radially within the interior of the cooling tower.

8. The invention of claim 7 wherein the outer wall is spaced radially inwardly from the outer perimeter of the cooling tower.

9. The invention of claim 1 including valving means for selectively closing at least some of the orifices to control the pressure reduction across the septum, between the lower chamber and the upper chamber.

10. The invention of claim 9 wherein the valving means includes valving ports in the cooling tower, the valving ports being aligned with corresponding orifices in the trough, and valving elements selectively insertable through the valving ports into the corresponding orifices for closing the corresponding orifices.

11. The invention of claim 10 wherein the orifices include a plurality of first orifices in the inner wall and a plurality of second orifices in the outer wall, at least some of the first orifices are located opposite counterpart second orifices in radial alignment therewith, and the valving ports are aligned with corresponding radially aligned first and second orifices such that the valving elements are insertable through corresponding first and second orifices.

12. The invention of claim 1 including means for regulating the level of cooling water collected in the trough while maintaining the level above the orifices.

13. The invention of claim 12 wherein the means for regulating the level of cooling water collected in the trough includes at least one overflow port located above the orifices.

14. The invention of claim 12 wherein the means for regulating the level of cooling water collected in the trough includes a drain line communicating with the bottom of the trough, and a regulating valve in the drain line for selective regulation of the volume of cooling water drained from the trough.

* * * * *